US008184343B2

(12) United States Patent
Tani et al.

(10) Patent No.: US 8,184,343 B2
(45) Date of Patent: May 22, 2012

(54) IMAGE FORMING APPARATUS, APPARATUS FOR CREATING ELECTRONIC ALBUM, IMAGE FORMING METHOD, METHOD FOR CREATING ELECTRONIC ALBUM, PROGRAM AND INDEX SHEET

(75) Inventors: Erika Tani, Kanagawa (JP); Taketoshi Yamashita, Saitama (JP); Shigeki Washino, Kanagawa (JP); Shinichi Utsumi, Kanagawa (JP); Yoshiharu Hibi, Kanagawa (JP); Shinichi Kobayashi, Kanagawa (JP); Katsuhiko Sugawara, Kanagawa (JP); Koji Aikawa, Kanagawa (JP); Yu Tsuda, Kanagawa (JP); Kohei Genda, Kanagawa (JP); Yoshio Kanesawa, Kanagawa (JP); Masaru Okutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1002 days.

(21) Appl. No.: 11/014,912

(22) Filed: Dec. 20, 2004

(65) Prior Publication Data

US 2005/0157343 A1 Jul. 21, 2005

(30) Foreign Application Priority Data

Jan. 14, 2004 (JP) ............................. P 2004-007042
May 11, 2004 (JP) ............................. P 2004-141287

(51) Int. Cl.
*H04N 1/40* (2006.01)
*G06F 15/00* (2006.01)
(52) U.S. Cl. ...................................... 358/3.28; 358/1.9
(58) Field of Classification Search .................. 358/453; 348/231.2, 231.99, 552, 601; 382/190, 224
See application file for complete search history.

(56) References Cited

U.S. PATENT DOCUMENTS

| | | | | |
|---|---|---|---|---|
| 5,689,610 A | * | 11/1997 | Manico et al. | 386/46 |
| 6,123,362 A | | 9/2000 | Squilla et al. | |
| 6,130,741 A | * | 10/2000 | Wen et al. | 355/40 |
| 6,288,719 B1 | | 9/2001 | Squilla et al. | |
| 6,434,579 B1 | | 8/2002 | Shaffer et al. | |
| 6,600,571 B1 | * | 7/2003 | Ito | 358/1.15 |
| 6,623,528 B1 | | 9/2003 | Squilla et al. | |
| 6,785,814 B1 | * | 8/2004 | Usami et al. | 713/176 |
| 2001/0048535 A1 | * | 12/2001 | Usami | 358/1.18 |

(Continued)

FOREIGN PATENT DOCUMENTS

JP 03-110680 5/1991

(Continued)

*Primary Examiner* — Dov Popovici
*Assistant Examiner* — Mesfin Getaneh
(74) *Attorney, Agent, or Firm* — Morgan, Lewis & Bockius LLP

(57) ABSTRACT

There are provided a first section for acquiring image data; a second section for storing the acquired image data; a third section for acquiring accessory information; a fourth section for storing the accessory information; a fifth section for generating an image ID and an accessory information ID; a sixth section for embedding the image ID and the accessory information ID in the image data; a seventh section for extracting an image ID and an accessory information ID from a result of scanning of the index sheet; an eighth section for reading accessory information on the basis of the accessory information ID; a ninth section for selecting image data through use of accessory information; a tenth section for reading selected image data; an eleventh section for arranging the image data; and a twelfth section for sending index sheet images having the information embedded therein and the arranged album images.

18 Claims, 17 Drawing Sheets

U.S. PATENT DOCUMENTS

| | | | |
|---|---|---|---|
| 2001/0048802 A1 | 12/2001 | Nakajima et al. | 386/46 |
| 2002/0030842 A1* | 3/2002 | Iida | 358/1.14 |
| 2003/0009673 A1* | 1/2003 | Hayashi et al. | 713/176 |
| 2003/0055840 A1* | 3/2003 | Kawaoka | 707/104.1 |
| 2003/0069893 A1* | 4/2003 | Kanai et al. | 707/104.1 |
| 2003/0160824 A1* | 8/2003 | Szumla | 345/769 |
| 2003/0223614 A1* | 12/2003 | Robins et al. | 382/100 |
| 2004/0001189 A1* | 1/2004 | Oka et al. | 355/40 |
| 2004/0003411 A1* | 1/2004 | Nakai et al. | 725/105 |
| 2004/0107204 A1* | 6/2004 | Sakamoto | 707/101 |
| 2004/0201752 A1* | 10/2004 | Parulski et al. | 348/231.99 |
| 2005/0050331 A1* | 3/2005 | Skurdal et al. | 713/176 |
| 2005/0105806 A1* | 5/2005 | Nagaoka et al. | 382/224 |
| 2006/0044581 A1* | 3/2006 | Cavill et al. | 358/1.12 |

FOREIGN PATENT DOCUMENTS

| | | |
|---|---|---|
| JP | 08-063574 A | 3/1996 |
| JP | 11-321029 | 11/1999 |
| JP | 2000-043363 | 2/2000 |
| JP | 2000-224525 | 8/2000 |
| JP | 2002-010068 | 1/2002 |
| JP | 2002-103698 | 4/2002 |
| JP | 2002-320174 A | 10/2002 |
| JP | 2004-048183 | 2/2004 |
| JP | 2004-072383 | 3/2004 |

* cited by examiner

FIG. 4A

| IMAGE ID | LOCATION INFORMATION |
|---|---|
| P001 | www.aaa.com/photo001.jpg |
| P002 | www.aaa.com/photo002.jpg |
| P003 | www.aaa.com/photo003.jpg |
| P004 | www.aaa.com/photo004.jpg |
| P005 | www.aaa.com/photo005.jpg |
| P006 | www.aaa.com/photo006.jpg |
| ⋮ | ⋮ |

FIG. 4B

| ACCESSSORY INFORMATION ID | LOCATION INFORMATION |
|---|---|
| F001 | www.aaa.com/info001.txt |
| F002 | www.aaa.com/info002.txt |
| F003 | www.aaa.com/info003.txt |
| F004 | www.aaa.com/info004.txt |
| F005 | www.aaa.com/info005.txt |
| F006 | www.aaa.com/info006.txt |
| ⋮ | ⋮ |

FIG. 7

| IMAGE ID | DATE | SUBJECT |
|---|---|---|
| P001 | 2003.12.16 11:00 | GIRL A, BOY B |
| P002 | 2003.12.16 13:30 | GIRL C |
| P003 | 2003.12.16 14:00 | GIRL C, GIRL A |
| ⋮ | ⋮ | ⋮ |
| P019 | 2003.12.16 10:50 | GIRL A |
| P020 | 2003.12.16 13:40 | BOY B |
| P021 | 2003.12.16 13:50 | GIRL A, BOY D |
| ⋮ | ⋮ | ⋮ |

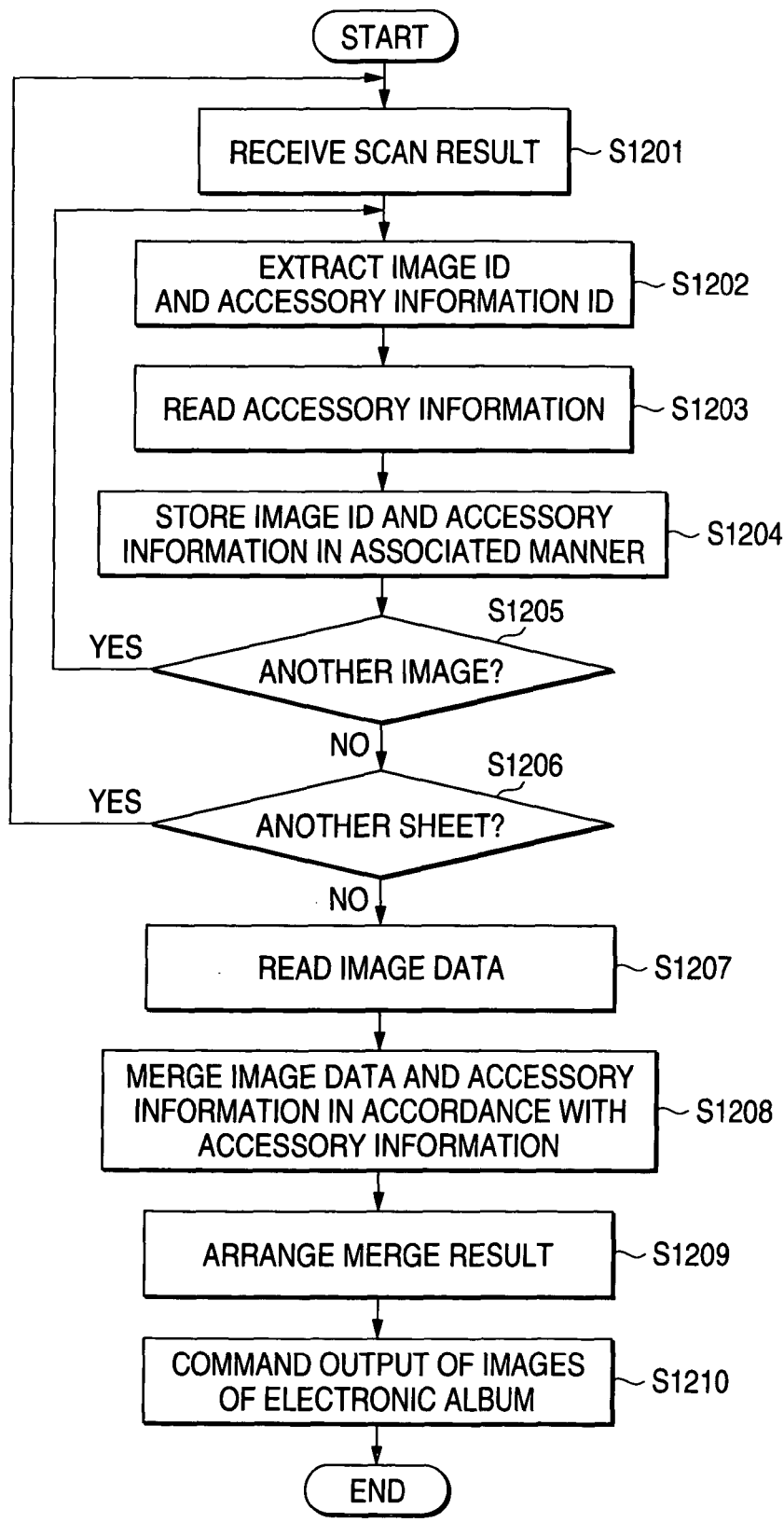

*FIG. 10*

| IMAGE ID | TEXT INFORMATION | LAYOUT INFORMATION |
|---|---|---|
| P001 | IN YAMASHITA PARK | RIGHT: WRITTEN VERTICALLY; ORDINARY |
| P002 | WONDERFUL LANDSCAPE! | RIGHT: WRITTEN HORIZONTALLY; BALLOON |
| P003 | IN PARK WITH A COMMANDING VIEW OF THE HARBOR | LEFT: WRITTEN VERTICALLY; ORDINARY |
| P004 | IN PARK WITH A COMMANDING VIEW OF THE HARBOR | RIGHT: WRITTEN VERTICALLY; ORDINARY |
| P005 | IN FOREIGNER CEMETARY | LEFT: WRITTEN VERTICALLY; ORDINARY |
| P006 | IN FOREIGNER CEMETARY | RIGHT: WRITTEN VERTICALLY; ORDINARY |
| ⋮ | ⋮ | ⋮ |

FIG. 15

| IMAGE ID | PHOTOGRAPHING CONDITIONS | GPS INFORMATION | ADDRESS OF SCALED-DOWN IMAGE | READING SEQUENCE | ADDRESS OF ORIGINAL IMAGE |
|---|---|---|---|---|---|
| 04010001 | C1 | G1 | sn/xx/0001.jpg | 11 | |
| 04010002 | C2 | G2 | sn/xx/0002.jpg | 8 | |
| 04010003 | C3 | G3 | sn/xx/0003.jpg | 7 | |
| 04010004 | C4 | G4 | sn/xx/0004.jpg | 5 | mn/xx/0004.jpg |
| 04010005 | C5 | G5 | sn/xx/0005.jpg | 1 | mn/xx/0005.jpg |
| 04010006 | C6 | G6 | sn/xx/0006.jpg | 12 | |
| 04010007 | C7 | G7 | sn/xx/0007.jpg | 2 | mn/xx/0007.jpg |
| 04010008 | C8 | G8 | sn/xx/0008.jpg | 3 | mn/xx/0008.jpg |
| .... | .... | .... | .... | .... | .... |

IMAGE FORMING APPARATUS, APPARATUS FOR CREATING ELECTRONIC ALBUM, IMAGE FORMING METHOD, METHOD FOR CREATING ELECTRONIC ALBUM, PROGRAM AND INDEX SHEET

BACKGROUND OF THE INVENTION

1. Field of the Invention

The present invention relates to an electronic album creation device for creating an electronic album from a result of scanning of an index sheet.

2. Description of the Related Art

Creation of an album from captured photographs has hitherto been widely practiced. In the case of silver film photographs, such an album is created through operations; that is, an operation for manually cataloging photographs, and an operation for affixing on photograph mounts photographs desired to be left, or inserting the photographs into pockets formed in the photograph mounts of the album. In many cases, a comment pertaining to a date, a location, and a subject(s) is provided to enable a reader to vividly recall, at a future time, situations in which the photographs were taken, and a piece of paper having such a comment is mounted on the photograph mount of the album along with the photographs.

In recent years, in association with proliferation of digital cameras, personal computers, and printers, cataloging of an album can be performed in each household without consumption of great efforts, through use of so-called electronic album preparation software (refer to JP-A-8-63574, for example).

SUMMARY OF THE INVENTION

However, when common electronic album preparation software is used, information to be used for specifying images to be included in the electronic album and text information about comments, or the like, to be added to the images must be input by way of a screen as occasion demands, thereby involving laborious operation. Consequently, there arises a problem of consumption of much time to create the album.

In this regard, in the invention of JP-A-8-63574, an image is specified and input by reading a bar code printed on an index sheet, and hence operation for creating an album is slightly lessened. However, the image is specified by a frame number, and this technique does not provide any function of creating an album in a more quickly and easily. Further, the text information (e.g., the degree of importance) to be added to an image is input as occasion demands, which in turn results in a laborious operation.

The present invention has been conceived to solve the above-mentioned technical problem and is aimed at enabling easy and rapid creation of an electronic album.

Another object of the present invention is to enable easy and rapid determination of images to be included in an electronic album and arrangement sequence of the images.

Still another object of the present invention is to enable input of text information to be added to images of an electronic album and quick and easy input and arrangement of text data to be added to images of the electronic album.

In light of the object, the present invention is arranged to output an index sheet additionally provided with information about details of respective images. Specifically, a first image forming apparatus of the present invention includes: an image data acquisition section for acquiring image data which are to become an original image included in an index sheet; an information addition section (e.g., an information embedding section) for adding, to the image data acquired by the image data acquisition section, information by means of which a computer interprets a feature content of the image data; and an image output section for outputting an image for use in an index sheet including the image data additionally provided with the information by the information addition section.

Further, information utilized for creating an electronic album can also be used as such information. In that case, a second image forming apparatus of the present invention includes an image data acquisition section for acquiring image data which are to become an original image included in an index sheet; an information addition section (e.g., an information embedding section) for adding, to the image data acquired by the image data acquisition section, information about the image data used when an electronic album is created on the basis of a result of scanning of the index sheet; and an image output section for outputting an image for use in an index sheet including the image data additionally provided with the information by the information addition section.

Moreover, the present invention also is directed toward creation of an electronic album through use of the thus-output index sheet. Specifically, an electronic album creation apparatus of the present invention includes an accessory information reading section for reading accessory information about respective images included in an index sheet through use of a result of scanning of the index sheet; and an accessory information processing section (i.e., an image data selection section, an image data reading section, a merging section and an arrangement section) for subjecting the respective images included in the index sheet to processing for creating an electronic album, through use of the accessory information about respective images read by the accessory information reading section.

Moreover, the present invention can also be conceived as a method for outputting an index sheet. In this case, an image forming method of the present invention includes the steps of: acquiring image data which are to become an original image included in an index sheet; adding, to the image data acquired by the image data acquisition section, information by means of which a computer interprets a feature content of the image data; and outputting an image for use in an index sheet including the image data additionally provided with the information.

Moreover, the present invention can also be conceived as a method for creating an electronic album through use of an index sheet. In this case, an electronic album creation method of the present invention includes the steps of: reading accessory information about respective images included in an index sheet through use of a result of scanning of the index sheet; and subjecting the respective images included in the index sheet to processing for creating an electronic album, through use of the accessory information about respective images read by the accessory information reading section.

Moreover, the present invention can also be conceived as a computer program for causing a computer to implement a function for outputting an index sheet. In this case, a first program of the present invention is for causing a computer to implement the functions of: acquiring image data which are to become an original image included in an index sheet; adding, to the image data acquired by the image data acquisition section, information by means of which a computer interprets a feature content of the image data; and outputting an image for use in an index sheet including the image data additionally provided with the information.

Moreover, the present invention can also be conceived as a computer program for causing a computer to implement a function for creating an electronic album. In this case, a second program of the present invention is directed for causing a computer to implement the functions of: reading accessory information about respective images included in an index sheet through use of a result of scanning of the index sheet; and subjecting the respective images included in the index sheet to processing for creating an electronic album, through use of the accessory information about respective images read by the accessory information reading section.

The present invention enables quick and easy preparation of an electronic album.

Further, the present invention enables quick and easy determination of images to be included in the electronic album and layout sequence of the same.

Still further, the present invention enables quick and easy input and arrangement of text information to be added to the images of the electronic album.

BRIEF DESCRIPTION OF THE DRAWING

These and other objects and advantages of this invention will become more fully apparent from the following detailed description taken with the accompanying drawings in which:

FIG. 4 is a view showing examples of first and second location management tables prepared in the first and second embodiments of the present invention;

FIG. 7 is a view showing an example accessory information management table prepared in the first embodiment of the present invention;

FIG. 9 is a flowchart showing operation for creating an electronic album according to the second embodiment of the present invention;

FIG. 10 is a view showing an example accessory information management table prepared in the second embodiment of the present invention;

FIG. 15 is a view showing an example content stored in a management information storage section according to the third embodiment of the present invention;

DETAILED DESCRIPTION OF THE PREFERRED EMBODIMENTS

An embodiment of the present invention will be described hereinbelow in detail by reference to the accompanying drawings.

Figure 1:
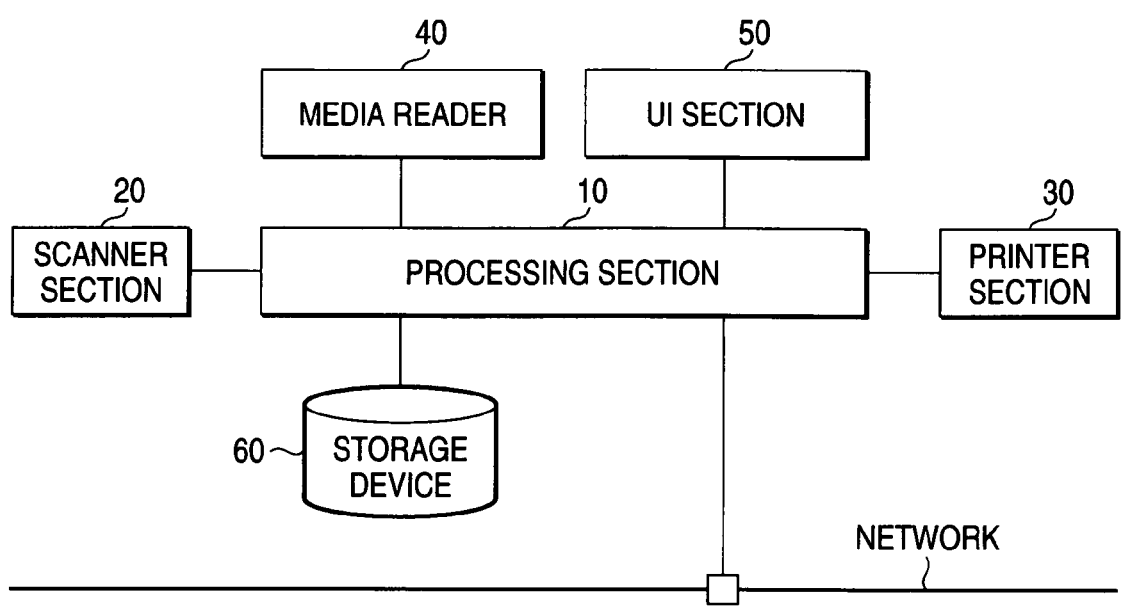
FIG. 1 is a block diagram showing a hardware configuration of a system to which an embodiment of the present invention is applied.

FIG. 1 shows an example hardware configuration of a system to which an embodiment of the present invention is applied. This system is formed from a processing section 10, a scanner section 20, a printer section 30, a media reader 40, an UI (user interface) section 50, and a storage device 60.

The processing section 10 is, e.g., a personal computer. Although not illustrated, the processing section 10 includes a central processing device (CPU), main memory, a bus for interconnecting them, or the like. The scanner section 20 is means for reading an original placed on a platen and transmitting the thus-read image to the processing section 10. The printer section 30 is means for outputting the image transmitted from the processing section 10, by means of transferring the image on paper. The media reader 40 has the function of reading image data from a recording medium used in a digital camera, such as flash memory. The UI section 50 is a section by way of which the user inputs data and the processing section 10 outputs to the user information to be submitted. For example, the UI section 50 is a touch panel display.

The storage device 60 is, e.g., a hard disk device (HDD); and has the function of serving as a location where image data are stored, as well as serving as a program for controlling the processing section 10 and a location where data required to control the program are stored.

However, embodiments are directed toward embedding of information showing features of images into respective images of an index sheet usually used for ascertaining the nature of the images recorded on a recording medium. The thus-embedded information can be used for various purposes. Hereinafter, the data are used particularly at the time of creation of an electronic album.

Specific embodiments will be described hereunder.

First Embodiment

First, the functional configuration of the processing section 10 of a first embodiment will be described by reference to FIG. 2.

Figure 2:
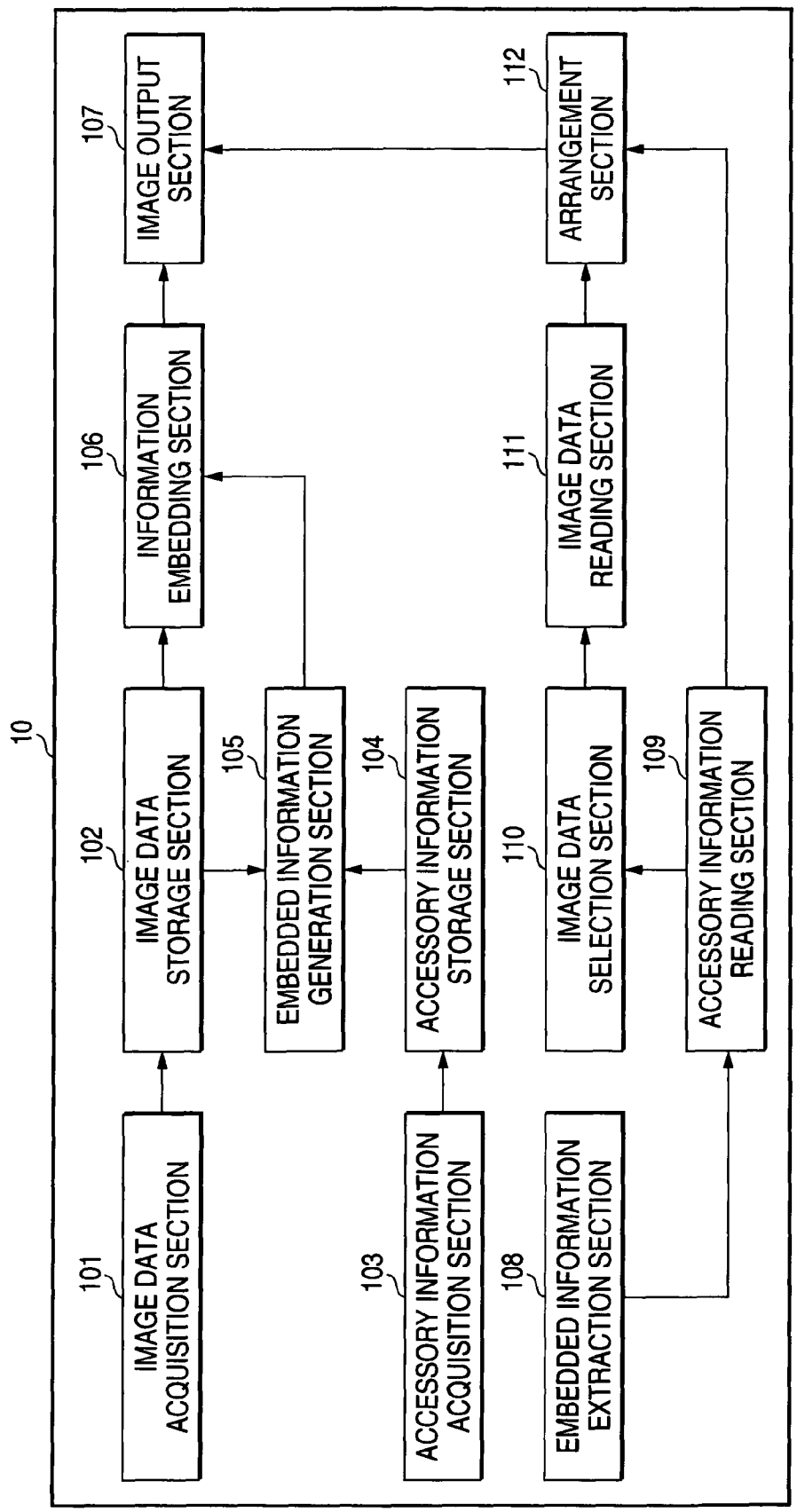
FIG. 2 is a block diagram showing a functional configuration of a processing section according to a first embodiment of the present invention.

As shown in FIG. 2, the processing section 10 includes, as sections having the function of outputting an index sheet, an image data acquisition section 101 for acquiring image data by way of the media reader 40; an image data storage section 102 for storing the acquired image data; an accessory information acquisition section 103 for acquiring accessory information to be associated with an image, by way of the media reader 40 or the UI section 50; an accessory information storage section 104 for storing the thus-acquired accessory information; an embedded information generation section 105 which generates an image ID uniquely identifying image data to thus manage the thus-generated image ID in association with location information pertaining to the image data and which generates an accessory information ID to be used for uniquely identifying accessory information to thus manage the accessory information in association with location information about the accessory information; and an information-embedding section 106 for embedding the image ID and the accessory information ID in the image data. The processing section 10 further includes, as sections for creating an electronic album, an embedded information extraction section 108 for extracting an image ID and an accessory information ID from the image read by the scanner section 20; an accessory information reading section 109 for reading accessory information on the basis of the accessory information ID; an image selection section 110 for selecting image data on the basis of accessory information; an image data reading section 111 for reading selected image data; and an arrangement section 112 for generating images for an album by arranging the thus-read images. Further, the processing section 10 has, as a section common to the index sheet output function section and the electronic album creation function section, an image output section 107 for sending to the printer section 30 an instruction for forming an image on the basis of the specified image data.

FIG. 2 is based on the premise that a single device has the index sheet output function and the electronic album creation function. However, it may be the case that the single device has only one of the index sheet output function and the electronic album creation function.

Operation of the processing section 10 according to the embodiment will now be described.

Figure 3:
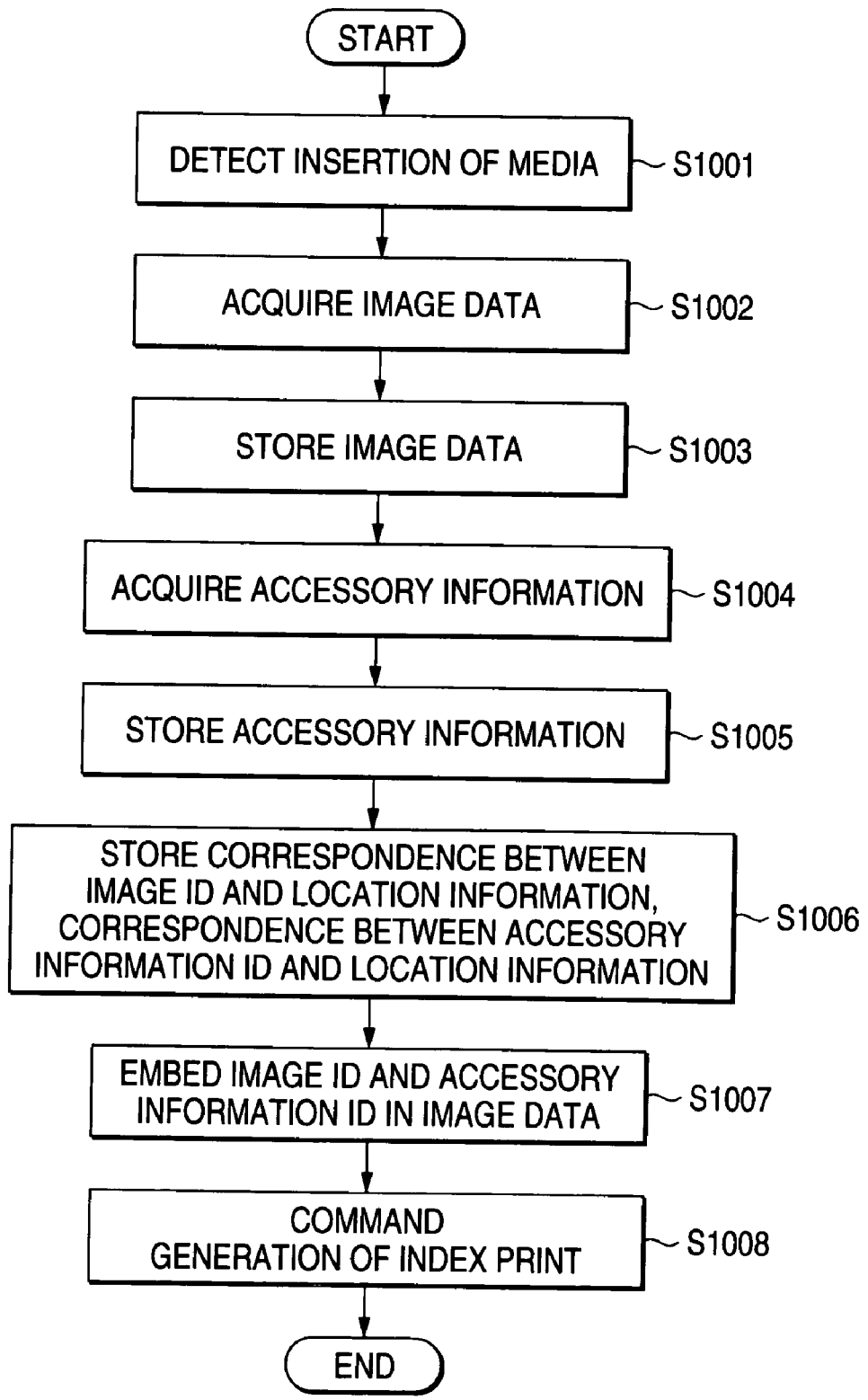
FIG. 3 is a flowchart showing operation for outputting an index sheet according to first and second embodiments of the present invention.

FIG. 3 is a flowchart showing operation for outputting an index sheet.

First, the image data acquisition section 101 detects insertion of a recording medium into the media reader 40 (step 1001), and acquires from the recording medium image data pertaining to images desired to be included in an index sheet (step 1002).

The image data storage section 102 stores the thus-acquired image data and passes to the embedded information generation section 105 location information to be used for locating the storage location (step 1003).

The location where image data are to be stored may be set to a machine of the user or a server on a network. When the image data are stored in the user's machine, information about a directory or a file in the storage device 60 can be used as location information. When the image data are stored in the server, a URL (Uniform Resource Locator) can be used as location information.

The accessory information acquisition section 103 acquires accessory information about the respective images acquired by the image data acquisition section 101 (step 1004).

Various conceivable accessory information items include information about a date when an image was recorded and a location where the image was recorded, information for specifying a subject(s) included in the image (e.g., a subject ID), information to be appended to the image at the time of creation of an electronic album, or the like. Also, various conceivable accessory information acquisition methods include a method for acquiring from an Exif file recorded together with the image data, and a method for acquiring the information input by the user via the UI section 50.

Exif (Exchangeable Image File Format) is a standard for an image file of a digital camera which is proposed by Fuji Photo Film Co., Ltd. and standardized by JEIDA (Japan Electronic Industry Development Association). Incidentally, the accessory information in the Exif file includes various information items such as thumbnail images generated by diminishing the quantity of image data or characteristic information about the original image.

The accessory information storage section 104 stores the acquired accessory information and passes to the embedded information generation section 105 the location information to be used for locating the storage location (step 1005).

The location where accessory information is to be stored may be set to a machine of the user or a server on a network. When the accessory information is stored in the user's machine, information about a directory or a file in the storage device 60 can be used as location information. When the accessory information is stored in the server, a URL (Uniform Resource Locator) can be used as location information.

In accordance with passage of these information items, the embedded information generation section 105 generates information to be embedded in the image data (step 1006). Specifically, the image ID to be used for uniquely identifying image data and the accessory information ID to be used for uniquely identifying accessory information are generated and transferred to the information embedding section 106. At this time, a first location management table, such as that shown in FIG. 4A, which associates the image IDs of the respective image data with location information items, is stored. Further, a second location management table, such as that shown in FIG. 4B, which associates the accessory information IDs of the respective accessory information items with location information items, is stored.

When the first and second location tables are assumed to be read from a single machine, the tables may be stored in the user's machine. In contrast, when subsequent reading of the tables is assumed to be performed by another machine connected to a network, the tables are stored in a specific server in the network.

Subsequently, the information embedding section 106 embeds the image ID and the accessory ID, both having been passed by the embedded information generation section 105, as Watermarks in the image data passed by the image data storage section 102 (step 1007).

Finally, the image output section 107 outputs to the printer section 30 the image data in which the Watermarks are embedded, to thus instruct the printer section 30 to output an index sheet (step 1008).

Figure 5:
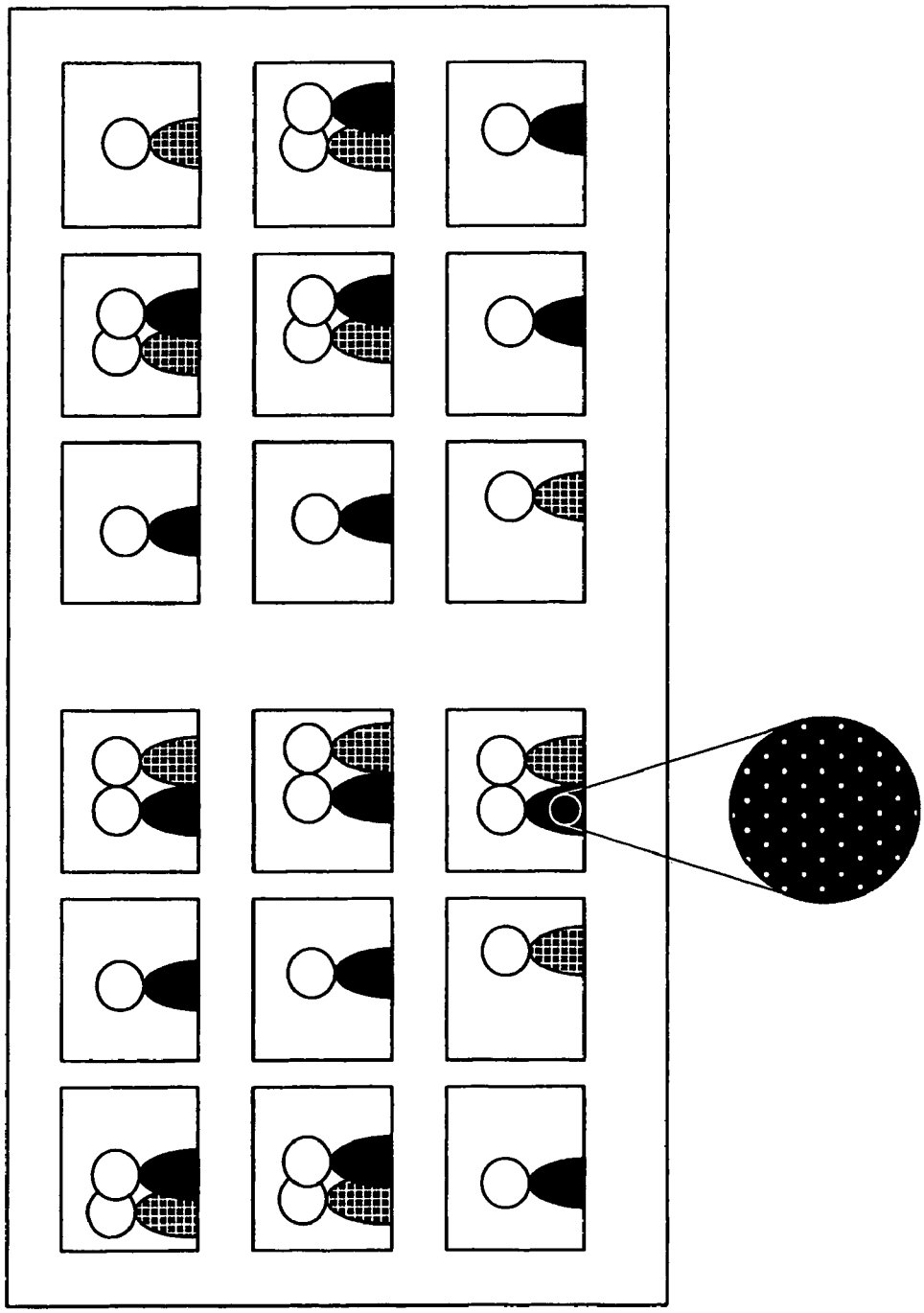
FIG. 5 is a view showing an example index sheet output in the first and second embodiments of the present invention.

As a result of such processing having been performed, the printer section 30 outputs an index sheet such as that shown in, e.g., FIG. 5. As shown in a circularly-enlarged area, the Watermarks are represented by; e.g., a dot pattern. Presence of this dot pattern can be sensed by an eye of the person who views the image.

The dot pattern is not a dot pattern which naturally appears in the image data, but must be a dot pattern which can be ascertained as an intentionally-embedded dot pattern. Conceivable methods for embedding such a dot pattern include, e.g., a method for embedding a black dot pattern in a low-density area of an image; and a method for embedding in an area of a single color a dot pattern of a color complementary to that color over a certain range.

The method for embedding a Watermark is not limited to that mentioned above. Any method may be employed, so long as a human eye cannot ascertain a difference before embedding of a Watermark and after embedding of the Watermark and the Watermark can be detected when the image is scanned.

Figure 6:
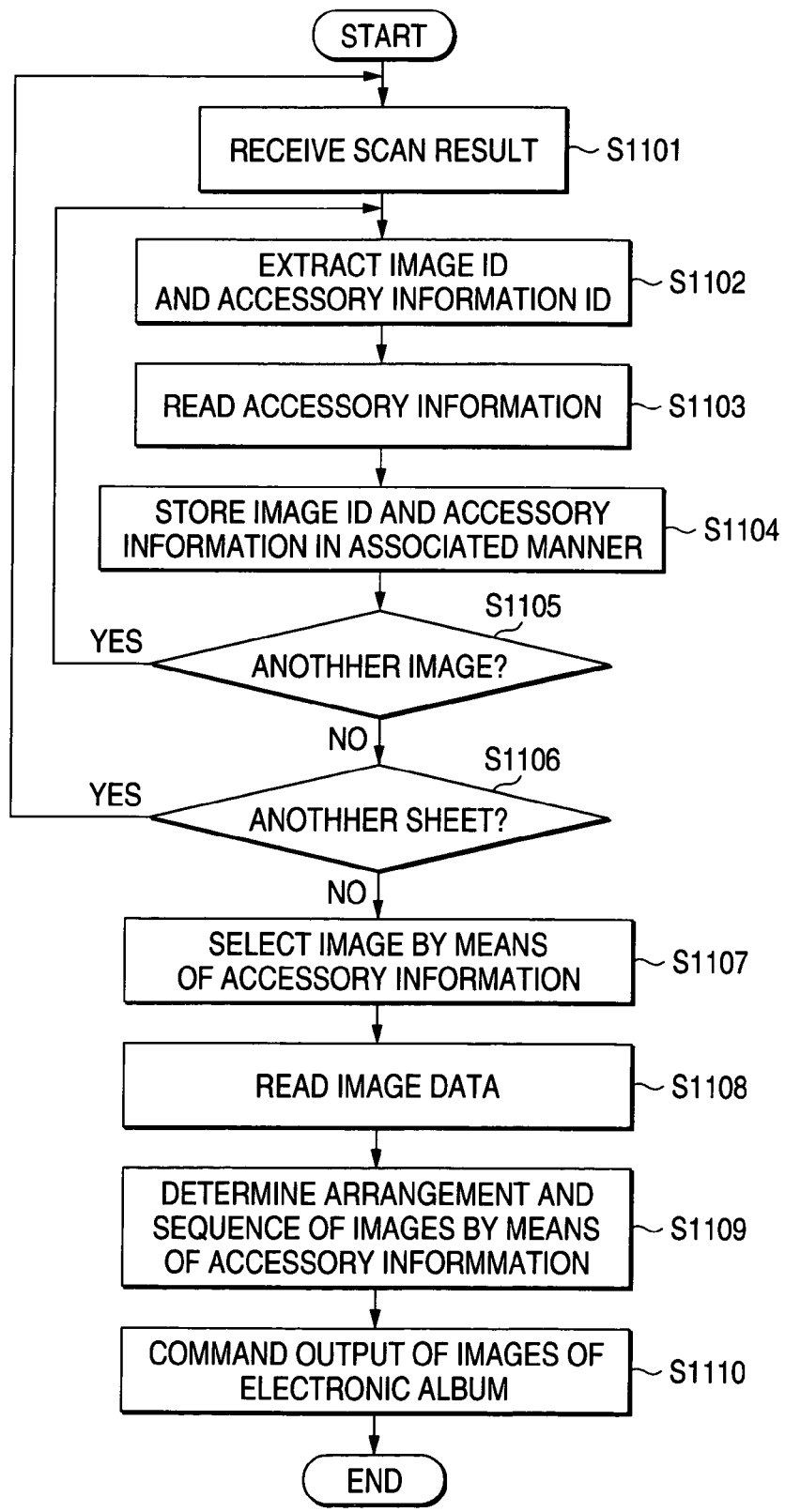
FIG. 6 is a flowchart showing operation for creating an electronic album according to the first embodiment of the present invention.

FIG. 6 is a flowchart showing operation for creating an album by use of the index sheet output in the manner mentioned above.

First, the processing section 10 receives a result of scanning of the index sheet performed by the scanner section 20 (step 1101). On the basis of the received scan result, the embedded information extraction section 108 slices an area where images are formed, and extracts an image ID and an accessory information ID from one of the images (step 1102).

By means of analyzing the images formed as a result of scanning of the index sheet, extraction of the image ID and the accessory information ID can be performed through the same procedures as those used when information is embedded.

Next, the accessory information reading section 109 retrieves the second location management table while taking as a key the accessory information ID extracted by the embedded information extraction section 108, and reads the accessory information from the storage place specified by the location information obtained as a result of retrieval (step 1103). The image ID and the read accessory information are stored in the accessory information management table in an associated manner (step 1104).

Subsequently, a determination is made as to whether or not unprocessed images are included in the scan result (step 1105). When unprocessed images are included, processing returns to step 1102. When unprocessed images are not included, processing proceeds to step 1106. A determination is then made as to whether or not a subsequent sheet exists (step 1106). When a subsequent sheet exists, processing proceeds to step 1101. When no subsequent sheet exists, processing proceeds to step 1107.

As a result of analysis performed in the above-described manner until no subsequent sheet exists, information such as that shown in, e.g., FIG. 7, is stored in the accessory information management table. FIG. 7 shows, as accessory information, information about a date when an image was recorded and information to be used for specifying a subject(s) in the image. Here, the date information is an example of attribute information used for determining the layout sequence of images. For instance, the date information may be another piece of information, such as a location. Moreover, the subject information is also an example of attribute information used for determining images to be included in the electronic album. For instance, the subject information may be another piece of information, such as a value representing the quality of an image. Moreover, accessory information other than information used in the above-described manner may be recorded in FIG. 7.

When the accessory information management table is generated as mentioned above, the image data selection section 110 selects image data to be included in the electronic album through use of accessory information, reads an image ID of the selected image, and passes the image ID to the image data reading section 111 (step 1107).

When the accessory information management table such as that shown in FIG. 7 is stored, the image data selection section 110 displays options, such as "Girl A," "Boy B," "Girl C," and "Boy D," on the UI section 50. When the user selects "Girl A," images "P001," "P003," "P019," and "P021," which include "Girl A" as a subject, are selected as images to be included in the album, and are passed to the image data reading section 111.

The image data reading section 111 retrieves the first location management table while taking the image ID of the image selected by the image data selection section 110 as a key, and reads image data from the storage location specified by the location information obtained as a retrieval result (step 1108).

The arrangement section 112 rearranges the images read by the image data reading section 111 in accordance with the user's instruction, to thus create an album (step 1109).

Specifically, the user is caused to specify data to be used for re-arranging the sequence of images. For instance, when the accessory information management table such as that shown in FIG. 7 is stored, the user specifies "Date," to thus create album images by arranging the image data in sequence of date.

Subsequently, the image output section 107 instructs the printer section 30 to make a print on the basis of the album images (step 1110).

Operation of the system of the embodiment is thus completed.

In the present embodiment, the image ID and the accessory information ID are embedded in combination in the respective images of the index sheet. However, when the image data and corresponding accessory information are associated with each other in a one-to-one correspondence, all of the information items may be managed by means of only, e.g., the image IDs. In that case, the embedded information generation section 105 generates only the image ID, and manages a correlation among the image ID, the location information passed from the image data storage section 102, and the location information passed from the accessory information storage section 104. The embedded information extraction section 108 extracts only the image ID from the images of the index sheet, and the accessory information reading section 109 reads accessory information on the basis of the image ID.

In the embodiment, other information items associated with the location information items, such as the image ID and the accessory information ID, are embedded in each of the images of the index sheet. However, the location information items may be embedded without modification. In that case, the embedded information generation section 105 passes the location information passed from the image data storage section 102 and the location information passed from the accessory information storage section 104 in unmodified form to the information embedding section 106 as information to be embedded. The embedded information extraction section 108 extracts the location information items; namely, the image data and the accessory information, from the images of the index sheet. The accessory information reading section 109 reads accessory information from the storage location specified by the location information of the accessory information item. The image data reading section 111 reads image data from the storage place specified by the location information of the image data.

The accessory information itself may be directly embedded in an image in lieu of the location information items of the accessory information. In this case, the accessory information storage section 104 does not function, and the accessory information acquired by the accessory information acquisition section 103 is passed, in unmodified form, as information to be embedded to the embedded information generation section 105. Moreover, the accessory information reading section 109 registers, in unmodified form, the accessory information passed from the embedded information extraction section 108 in the accessory information management table.

In addition to the method for embedding information as a Watermark, a modified method for adding information as a frame of an image or outputting information as a bar code to a position corresponding to an image is also conceivable as a method for embedding information in an image of the index sheet.

In this case, in the present embodiment, attribute information showing a feature of the content of each image is adopted as accessory information of each image of the index sheet. At the time of creation of an electronic album, images are catalogued by use of this attribute information. As a result, classification and layout of images can be performed readily and quickly during the course of creation of an electronic album.

For instance, information about a subject is adopted as attribute information, and the information is used for determining images to be included in the electronic album. For instance, photographs showing only an eldest son or an eldest daughter are extracted from the photographs showing all members of the family, and an album of an individual can also be created easily.

Further, date information is adopted as attribute information, and the information is used for determining the sequence of images in the electronic album. As a result, an album in which photographs are sorted in sequence of date can be quickly and readily created by collecting (merging) photographs captured by friends who have gone on a trip together.

Second Embodiment

First, the functional configuration of the processing section 10 of the embodiment will be described by reference to FIG. 8.

Figure 8:
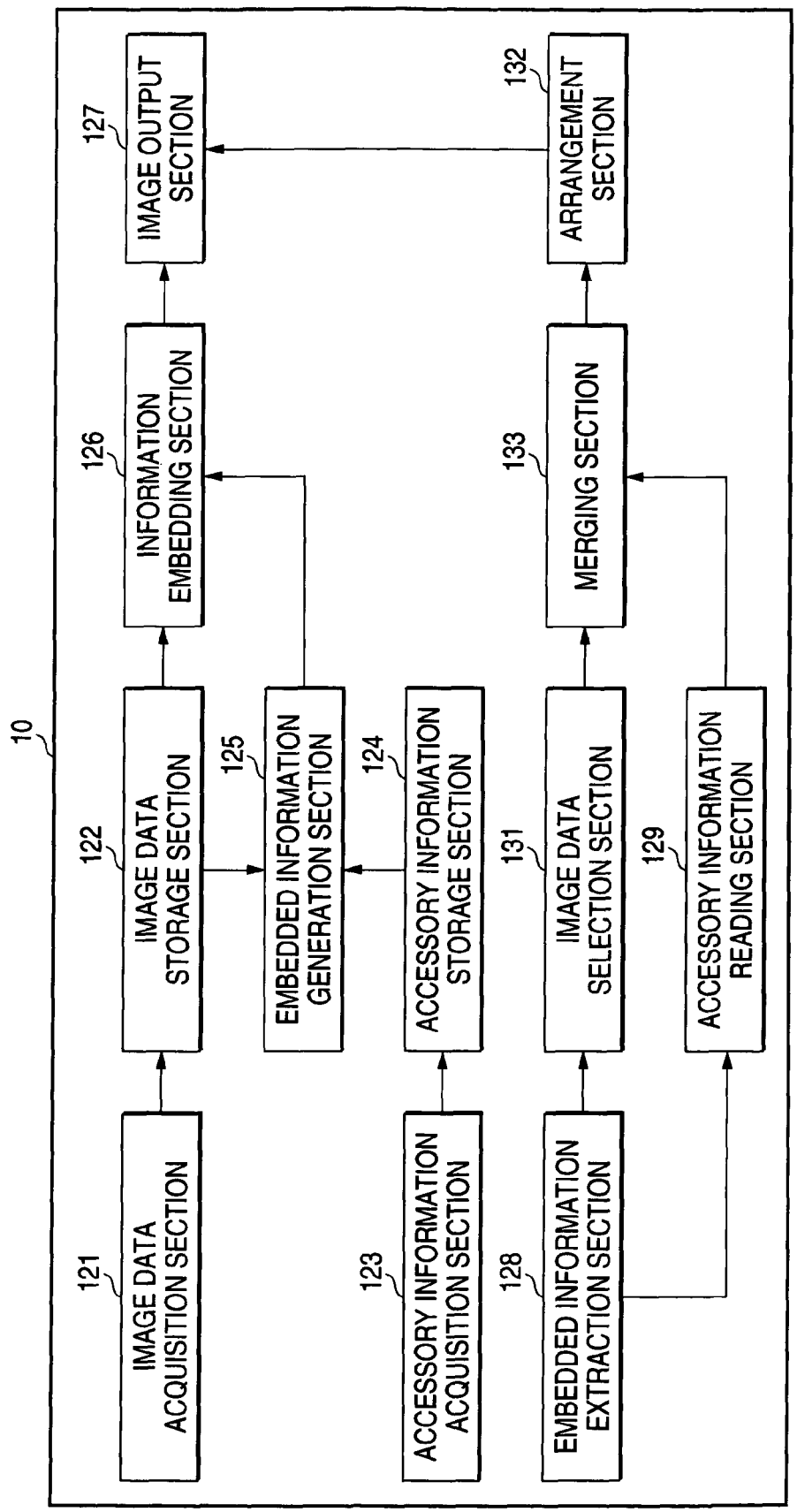
FIG. 8 is a block diagram showing a functional configuration of a processing section according to the second embodiment of the present invention.

As shown in FIG. 8, the processing section 10 includes, as the index sheet output function sections, an image data acquisition section 121 for acquiring image data by way of the media reader 40; an image data storage section 122 for storing the thus-acquired image data; an accessory information acquisition section 123 for acquiring accessory information associated with image data by way of the media reader 40 or the UI section 50; an accessory information storage section 124 for storing the thus-acquired accessory information; an embedded information generation section 125 which generates an image ID uniquely identifying image data to thus manage the image data and location information about the image data in an associated manner and which generates an accessory information ID for uniquely identifying accessory information to thus manage the accessory information and location information of the accessory information in an associated manner; and an embedded information embedding section 126 the image ID and the accessory information ID in image data. The processing section 10 further includes, as electronic album creation function sections, an embedded information extraction section 128 for extracting an image ID and an accessory information ID from the image read by the scanner section 20; an accessory information reading section 129 for reading accessory information on the basis of the accessory information ID; an image selection section 131 for selecting image data on the basis of the image ID; a merging section 133 for merging the read image data and the accessory information together; and an arrangement section 132 which arranges the merged images to thus create album images. Further, the processing section 10 has, as a section common to the index sheet output function section and the electronic album creation function section, an image output section 127 for sending to the printer section 30 an instruction for forming an image on the basis of the specified image data.

FIG. 8 is based on the premise that a single device has the index sheet output function and the electronic album creation function. However, it may be the case that the single device has only one of the index sheet output function and the electronic album creation function.

Operation of the processing section 10 according to the embodiment will now be described.

Even in this embodiment, the index sheet is output pursuant to the flowchart shown in FIG. 3. Details of the processing are the same as those described in connection with the first embodiment, and hence their explanations are omitted.

FIG. 9 is a flowchart showing operation for creating an album by use of the index sheet output in accordance with the flowchart shown in FIG. 3.

First, the image data acquisition section 10 receives a result of scanning of the index sheet performed by the scanner section 20 (step 1201). The embedded information extraction section 128 clips an area where images are formed, from the received scan result. An image ID and an accessory information ID are extracted from one of the images (step 1202).

Extraction of the image ID and the accessory information ID can be performed by analyzing the images formed as a result of scanning of the index sheet through the same procedures as those used at the time of embedding of the information.

Next, the accessory information reading section 129 retrieves a second location management table while taking the accessory information ID extracted by the embedded information extraction section 128 as a key, and reads accessory information from the storage location specified by the location information acquired as a result of retrieval (step 1203). The image ID and the read accessory information are registered in the accessory information management table in an associated manner (step 1204).

Subsequently, a determination is made as to whether or not unprocessed images still exist in the scan result (step 1205). When unprocessed images still exist, processing returns to step 1202. When no unprocessed images exist, processing proceeds to step 1206. A determination is made as to whether or not a subsequent sheet exists (step 1206). When a subsequent sheet exists, processing proceeds to step 1201. When no subsequent sheet exists, processing proceeds to step 1207.

As a result of analysis having been performed until the sheets are processed, information such as that shown in, e.g., FIG. 10, is stored in the accessory information management table. FIG. 10 shows text information to be added to an image and layout information showing the layout of the text information, as accessory information items. Here, of three information items in the layout information, which are segmented from each other by ";," the leftmost information item signifies a position on an image where the text information is to be arranged. Among the three information items, the information item located in the middle signifies whether or not the text information is to be written vertically or horizontally. The rightmost information item shows whether or not the text information is to be displayed in a balloon. Accessory information other than the information items used in the above-described manner may be recorded in the table shown in FIG. 10.

When the accessory information management table is generated in the manner as mentioned above, the image data reading section 131 retrieves the first location management table while taking the image ID as a key, and reads image data from the storage location specified by the location information obtained as a result of retrieval (step 1207).

Next, the merging section 133 merges the image data read by the image data reading section 131 with the text information item associated with the image ID of that image data in the accessory information management table, with a layout indicated by the layout information associated with the image ID (step 1208).

The arrangement section 132 generates an album image by arranging the result of merging operation performed by the merging section 133 (step 1209).

Figure 11:
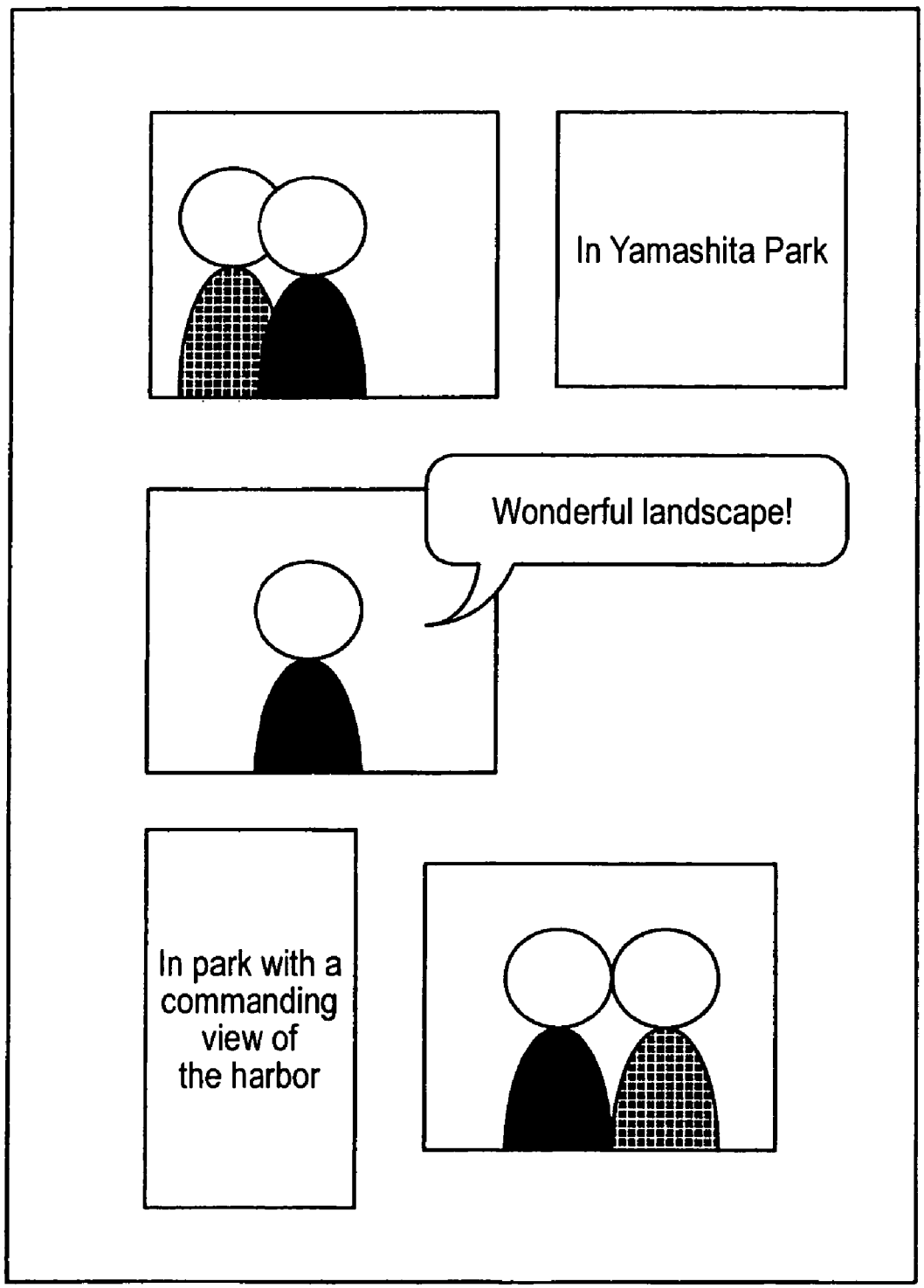
FIG. 11 is a view showing examples of album images output in the second embodiment of the present invention.

Subsequently, the image output section 127 instructs the printer section 30 to produce a print on the basis of the album image (step 1210). As a result, album images such as those shown in FIG. 11 are output in connection with the images indicated by the image IDs "P001," "P002," and "P003" of the accessory information management table shown in FIG. 10.

Operation of the system of the present embodiment is thus completed.

In the present embodiment, two information items; that is, the image ID and the accessory information ID, are embedded in combination in the respective images of the index sheet. However, when the image data and corresponding accessory information are associated with each other in a one-to-one correspondence, all of the information items may be managed by means of only, e.g., the image IDs. In that case, the embedded information generation section 125 generates only the image ID, and manages a correlation among the image ID, the location information passed from the image data storage section 122, and the location information passed from the accessory information storage section 124. The embedded information extraction section 128 extracts only the image ID from the images of the index sheet, and the accessory information reading section 129 reads accessory information on the basis of the image ID.

In the embodiment, other information items associated with the location information items, such as the image ID and the accessory information ID, are embedded in each of the images of the index sheet. However, the location information items may be embedded without modification. In that case, the embedded information generation section 125 passes the location information passed from the image data storage section 122 and the location information passed from the accessory information storage section 124 in unmodified form to the information embedding section 126 as information to be embedded. The embedded information extraction section 128 extracts the location information items; namely, the image data and the accessory information, from the images of the index sheet. The accessory information reading section 129 reads accessory information from the storage location specified by the location information of the accessory information item. The image data reading section 131 reads image data from the storage location specified by the location information of the image data.

The accessory information itself may be directly embedded in an image in lieu of the location information items of the accessory information. In this case, the accessory information storage section 124 does not function, and the accessory information acquired by the accessory information acquisition section 123 is passed, in unmodified form, as information to be embedded to the embedded information generation section 125. Moreover, the accessory information reading section 129 registers in the accessory information management table, in unmodified form, the accessory information passed from the embedded information extraction section 128.

In addition to the method for embedding information as a Watermark, a modified method for adding information as a frame of an image or outputting information as a bar code to a position corresponding to an image is also conceivable as a method for embedding information in an image of the index sheet.

As mentioned above, in the present embodiment, text information or the layout information, which is to be added to each image, is adopted as layout information serving as the accessory information of each image of the index sheet. A comment whose details are specified by these information items is added in a specified form at the time of creation of an electronic album. As a result, operation for adding a comment to the image can be performed quickly and readily.

Third Embodiment

In association with the above embodiments, there is another embodiment.

This embodiment of the present invention can be applied to any system including first equipment which stores original images and thumbnail images corresponding to the respective original images, and second equipment which reads all of the thumbnail images from the first equipment, and reads original images corresponding to the thumbnail images selected from all of the thumbnail images, thereby performing predetermined processing. Detailed descriptions will be given hereinbelow to a case where a portable terminal, such as a portable cellular phone provided with a camera, is taken as first equipment and where an image-forming apparatus, such as a printer, is taken as second equipment.

Figure 12:
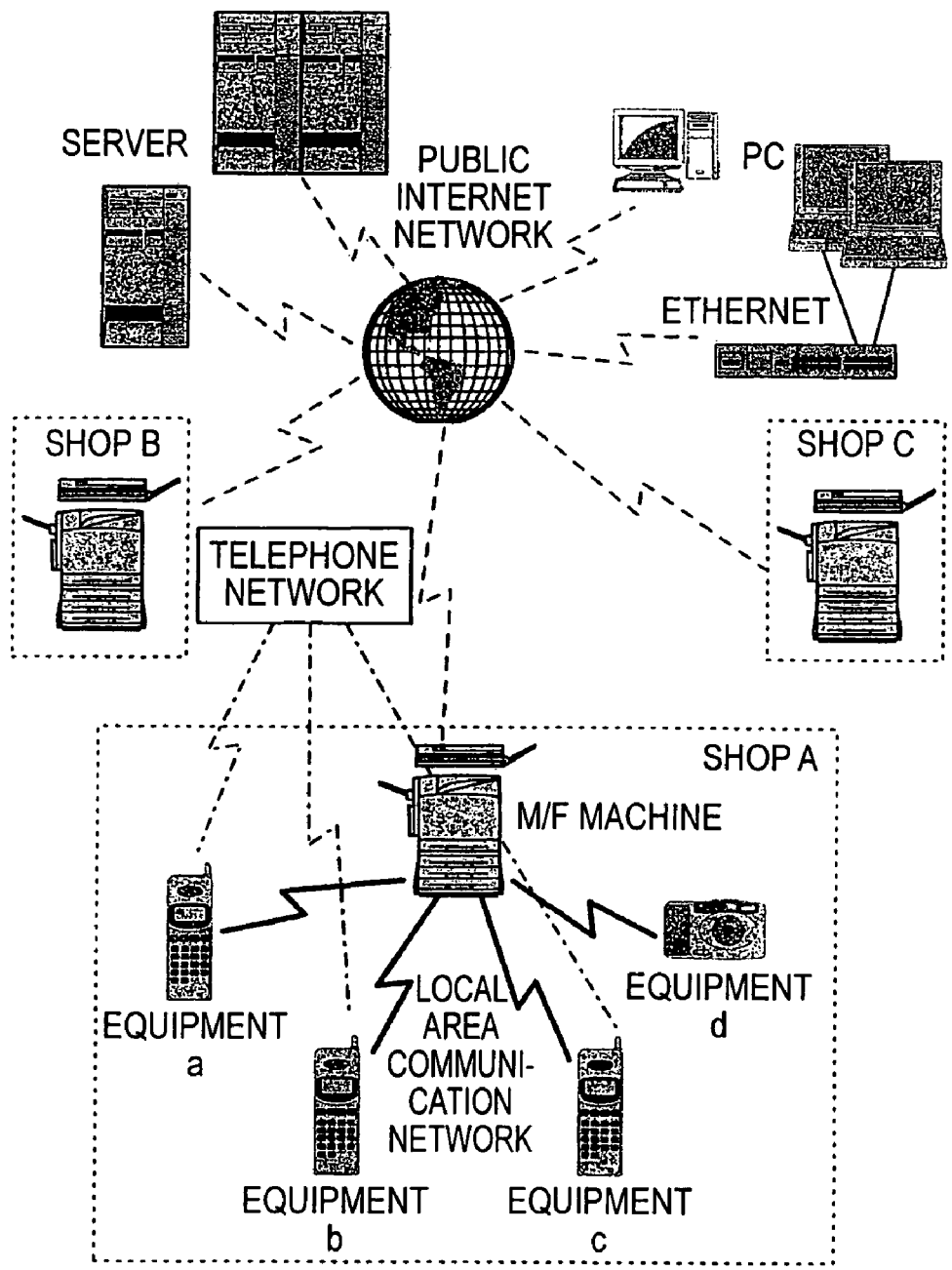
FIG. 12 is a block diagram showing a configuration of a network system including an image-forming apparatus according to a third embodiment of the present invention.

FIG. 12 is a view showing a network system including an image-forming apparatus according to an embodiment of the present invention. Description of the present embodiment is pursued while the image-forming apparatus is presumed to be a multifunction machine (hereinafter called an "M/F machine") having a copying function, a printer function, a facsimile function, and a scanner function.

As shown in FIG. 12, as the case may be, the network system is embodied by a plurality of M/F machines, a server computer (hereinafter called a "server"), and a personal computer (hereinafter called a "PC") being connected to a public Internet network by way of an Ethernet (registered trademark of Fuji Xerox Co., Ltd.). Each of the M/F machines is usually disposed in a shop, such as a convenience store, to thus offer service, and such a situation is illustrated. Moreover, pieces of equipment "a," "b," "c" and "d" capable of establishing radio communication with the M/F machine are shown to be present around the M/F machine in Shop A. Of these pieces of equipment, the pieces of equipment "a," "b," and "c" are portable cellular phones and hence can also be connected to a telephone network.

Figure 13:
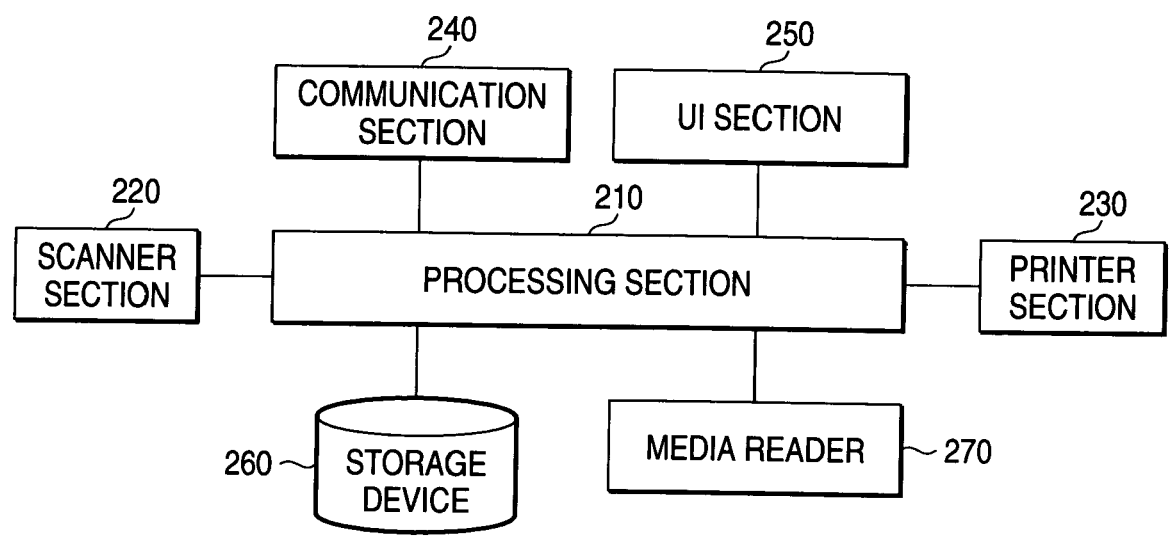
FIG. 13 is a block diagram showing a hardware configuration of the image-forming apparatus according to the third embodiment of the present invention.

FIG. 13 shows an example hardware configuration of an image-forming apparatus to which the embodiment of the present invention is applied. This image-forming apparatus includes a processing section 210, a scanner section 220, a printer section 230, a communication section 240, a UI (User Interface) section 250, a storage device 260, and a media reader 270.

The processing section 210 is means for subjecting to predetermined processing image data acquired by way of the scanner section 220, the communication section 240, or the media reader 270 and outputting the result of processing to the printer section 230. For instance, in addition to having the known functions, such as functions for enlarging or miniaturizing image data, the means has a function unique to the present embodiment which will be described later. These functions can also be implemented by means of, rather than only hardware, a combination of hardware and software. In the latter case, an unillustrated CPU (Central Processing Unit) of the processing section 210 implements respective functions by means of reading into main memory a program stored in the storage device 260.

The scanner section 220 is means which reads an original document placed on a platen and transmits the result of reading to the processing section 210. The printer section 230 is means for outputting the image transmitted from the processing section 210 by transferring the image onto paper.

The communication section 240 is means for establishing communication with another piece of equipment by way of wireless or wired communication means.

The UI section 250 is means by way of which the user inputs data to the processing section 210 and the processing section 210 outputs to the user information to be submitted. For example, the UI section 250 is a touch panel display.

The storage device 260 is, e.g., a hard disk device (HDD), and serves as means for storing the image data acquired by way of the scanner section 220, the communication section 240, or the media reader 270. Further, a computer program to be used for implementing respective functions to be described later is also stored in the processing section 210. The computer program may be installed from the storage medium or installed after having been downloaded by way of a communication line, such as the Internet. Moreover, data to be used by the computer program are also stored in the storage device 260.

The media reader 270 is means for reading image data from the storage medium used in a digital camera, such as flash memory.

The functional configuration of the processing section 210 of an embodiment will be described.

Figure 14:
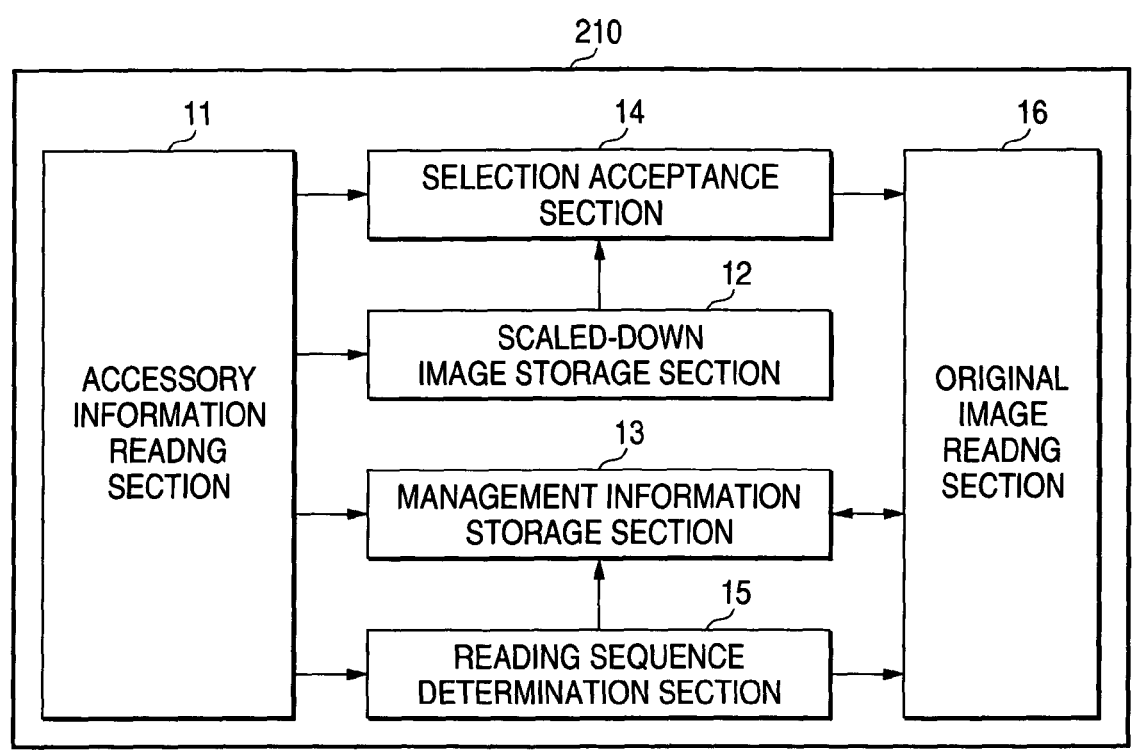
FIG. 14 is a block diagram showing a functional configuration of a processing section of the image-forming apparatus according to the third embodiment of the invention.

FIG. 14 is a block diagram showing the functional configuration of the processing section 210.

As shown in FIG. 14, the processing section 210 has an accessory information reading section 11, a scaled-down image storage section 12, a management information storage section 13, a selection acceptance section 14, a reading sequence determination section 15, and an original image reading section 16.

The accessory information reading section 11 is a section for reading accessory information attached to an original image. In this case, information attached to an original image of an Exit file can be adopted as accessory information. Consequently, if attention is paid to the thumbnail images, the accessory information reading section 11 functions as a "scaled-down image reading section." If attention is paid to characteristic information, the accessory information reading section 11 serves as a "characteristic information acquisition section."

The scaled-down image storage section 12 is a section for storing, e.g., thumbnail images included in the accessory information.

The management information storage section 13 is a section for storing information showing a characteristic of an original image (characteristic information), addresses where the original images and thumbnail images are stored, or the like. Details of the management information storage section 13 will be described later.

Moreover, the selection acceptance section 14 is a section which displays a read thumbnail image on the UI section 250 and accepts a selection made by the user. The reading sequence determination section 15 is a section for setting a sequence in which the original images are to be read (hereinafter simply referred to as a "reading sequence") with respect to the management information stored in the management information storage section 13. The original image reading section 16 is a section which reads the original image on the basis of the reading section set by the management information storage section 13 and which reads the original image corresponding to the thumbnail image for which the selection acceptance section 14 has received a selection.

Although not shown in FIG. 14, there may be provided a "characteristic information acquisition section" which acquires characteristic information about the respective original images by analyzing the thumbnail image stored in the scaled-down image storage section 12 and stores the characteristic information in the management information storage section 13.

The information stored in the management information storage section 13 will be described by reference to FIG. 15.

As shown in FIG. 15, the management information storage section 13 stores a correspondence among, e.g., an image ID, photographing conditions, GPS information, the address of a scaled-down image, a reading sequence, and the address of an original image.

The ID image is identification information for uniquely identifying an image. When an image can be uniquely identified by means of a file name in the accessory information, the information may be used. If an image cannot be uniquely identified by means of a file name in the accessory information, the image forming apparatus may originally generate information.

The photographing conditions and the GPS information are examples of the characteristic information about the original image. These information items can be acquired from the accessory information. Alternatively, the information items may be acquired from thumbnail images stored in the scaled-down image storage section 12.

The address of the scaled-down image corresponds to a stored location (address) of each thumbnail image in the memory where the thumbnail images are stored. The reading sequence is a sequence in which the original images determined on the basis of the photographing conditions and/or GPS information are read. Moreover, the address of the original image is a stored location (address) of each original image in the memory where the original images are stored.

Printing operation of the present embodiment will now be described by reference to FIG. 16.

Figure 16:
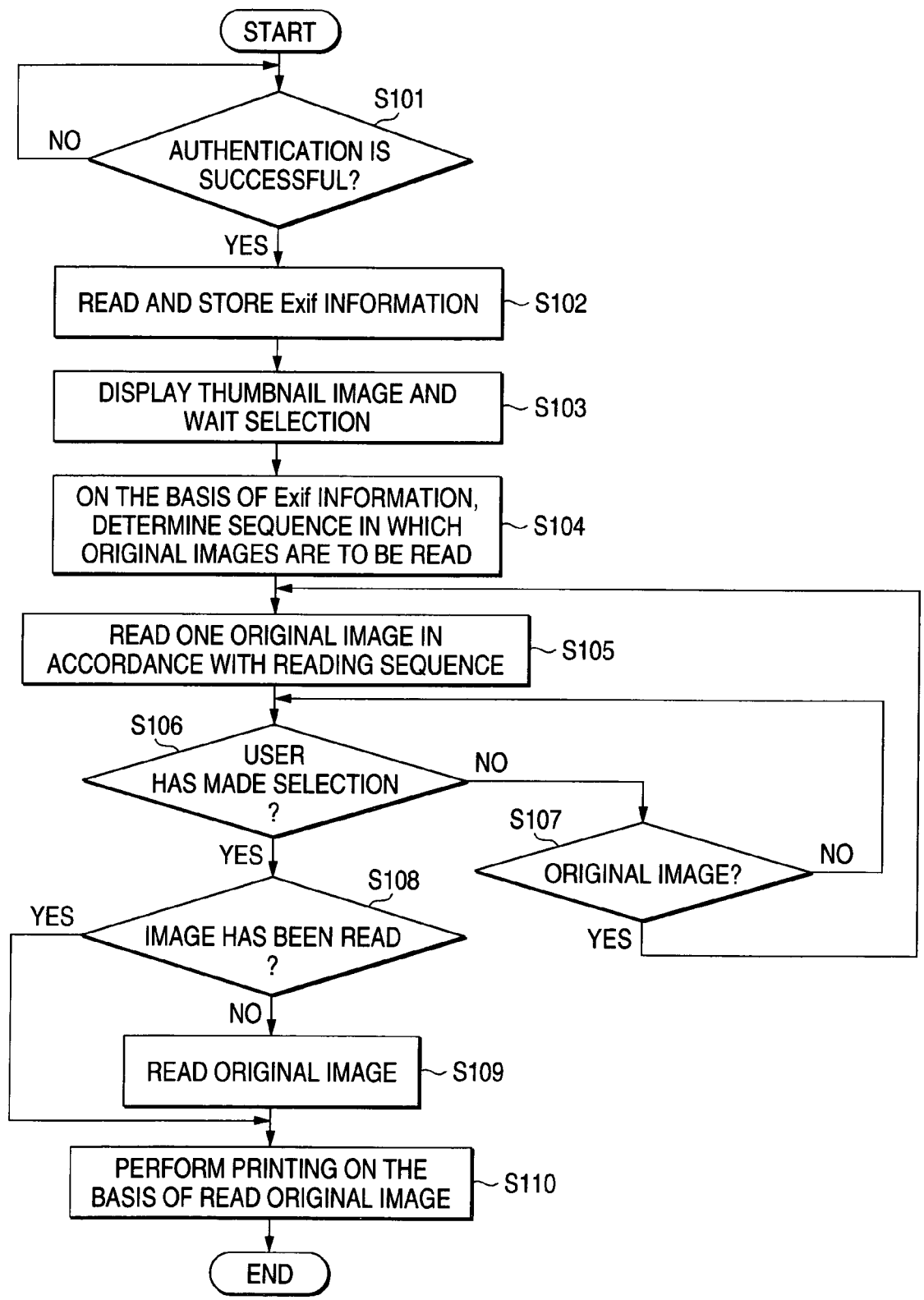
FIG. 16 is a flowchart showing operation of the image-forming apparatus according to the third embodiment of the present invention.

FIG. 16 is a flowchart showing operation of the image-forming apparatus. In connection with the descriptions of the operation, images are assumed to be managed as Exif files, and information attached to an original image in the Exif file (hereinafter called "Exif information") is used as accessory information.

First, the user requests the image forming apparatus to establish radio connection through use of, e.g., a portable terminal, whereupon operation is commenced. As a result, the image-forming apparatus performs authentication of the portable terminal (step 101). If authentication has not been successfully performed, processing pertaining to step 101 is repeated. If authentication has been successfully achieved, processing proceeds to step 102.

Next, the accessory information reading section 11 acquires the Exif information from the portable terminal, and stores the thumbnail images included in the Exif information in the scaled-down image storage section 12. Further, the management information for managing the thumbnail images is stored in the management information storage section 13 (step 102). In the embodiment shown in FIG. 15, "04010001," "04010002," . . . , are generated as the image IDs, and storage addresses "sn/xx/0001.jpg," "sn/xx/0002.jpg," . . . of the thumbnail images in the scaled-down image storage section 12 are stored in association with the image IDs. Photographing conditions "C1," "C2," . . . and GPS information "G1," "G2," . . . are acquired from the Exif information or by analysis of the thumbnail images. These conditions and information items are also stored in association with the image IDs.

The selection acceptance section 14 to which control has been passed by the accessory information reading section 11 reads thumbnail images from the scaled-down image storage section 12, displays the thumbnail images on the UI section 250, and awaits selection made by the user (step 103).

In the meantime, the read sequence determination section 15 having received control from the accessory information reading section 11 determines the sequence in which original images corresponding to the respective thumbnail images are read, and stores the reading sequence in the management information storage section 13 (step 104). In the embodiment shown in FIG. 15, a reading sequence is determined such that an original image assigned an image ID "04010005" comes to the first; an original image assigned an image ID "04010007"

comes to the second; an original image assigned an image ID "04010008" comes to the third . . . . A specific method for determining a reading sequence will be described later.

Subsequently, the original image reading section 16 to which control has been passed by the reading sequence determination section 15 reads one original image in accordance with the reading sequence stored in the management information storage section 13 (step 105). In connection with the embodiment shown in FIG. 15, an original image assigned an image ID "04010005" is read. At that time, an address where the original image is stored, such as "nm/xx/0005.jpg," is stored in the management information storage section 13.

In the meantime, when the selection acceptance section 14 has selected an image to be printed from among the displayed thumbnail images, information to this effect is passed to the original image reading section 16. Accordingly, the original image reading section 16 determines whether or not such information has been passed from the selection acceptance section 14 (step 106). If the result of determination shows that such information has not been passed, the original image reading section 16 determines whether or not the next turn is to arise in the reading sequence stored in the management information storage section 13 (step 107). Specifically, a determination is made whether or not unread original images still remain. If the result of determination shows that there are unread original images, processing returns to step 105. If there are not any unread images, processing returns to step 106, where a user's selection is awaited.

In FIG. 15, the addresses of the original images corresponding to the fifth images in the reading sequence are stored. This shows that information indicating that the thumbnail images have been selected is not passed from the selection acceptance section 14 until at least the fifth original image in the reading sequence is read.

However, when the information indicating that the user has made a selection is received in step 106, the following processing is performed. Specifically, a determination is made as to whether or not the original images corresponding to the selected thumbnail images have already been read (step 108). Whether or not the original images have already been read can be determined on the basis of whether the stored addresses of the original images are stored in the management information storage section 13.

Consequently, it the stored addresses have not yet been read, the original images are read from the portable terminal (step 109), and printing is performed on the basis of the read original images (step 110). In contrast, if the addresses have already been read, printing is performed on the basis of the thus-read images (step 110). Consequently, printing is performed by reading the original images from the addresses of the original images stored in the management information storage section 13.

However, the following methods are conceivable as the method for determining the previously-described reading sequence.

1) Determination of a Reading Sequence on the Basis of Photographing Conditions

For instance, "Photograph Sharpness" specified in Exif 2.3 can be used as the photographing conditions. Namely, the reading sequence is set such that an image whose value of "Photograph Sharpness" exhibits greater "sharpness" is read faster.

Figure 17:
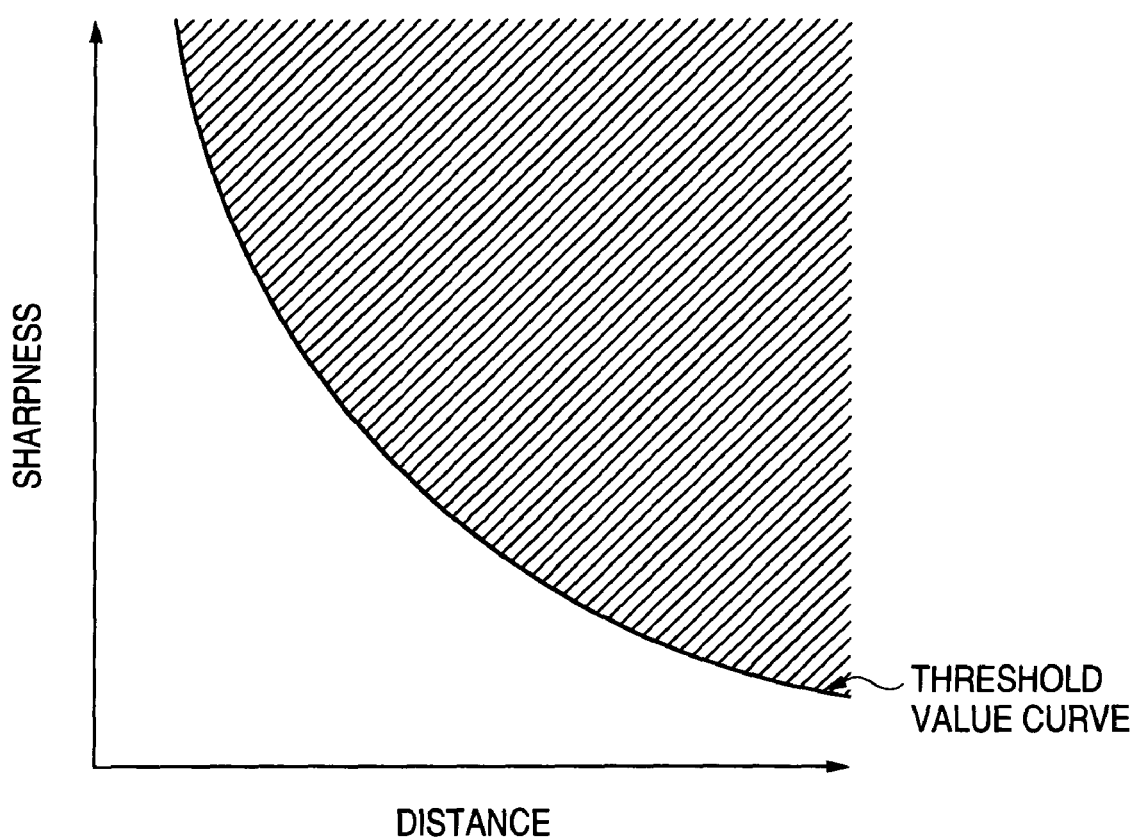
FIG. 17 is a view for describing a specific method of the third embodiment of the invention for determining a sequence in which original images are to be read.

Generally, sharpness tends to deteriorate (become blurred) with increasing distance from a camera to an object. Determination of the reading sequence using "Object Distance" specified in the same Exif 2.3 as well as "Photograph Sharpness" is also conceivable. As shown in FIG. 17, "Photograph Sharpness" is set for the vertical axis, and "Object Distance" is set for the horizontal axis. "Photograph Sharpness" and "Object Distance" of respective images are plotted on the graph. Advanced reading of the original images is performed in accordance with a predetermined rule such that an image plotted in an upper right region of a threshold value curve (a hatched region) is read faster than is an image plotted in a lower left region of the threshold value curve.

2) Determination of a Reading Sequence on the Basis of GPS Information

Positional information about a reference point (e.g., a home) has been registered in advance. A distance from the reference point to a photographing point is determined on the basis of this positional information and positional information about a photographing point indicated by the GPS information. The reading sequence is determined such that the greater the distance (or the smaller the distance), the faster the reading sequence.

A correlation between positional information indicated by the GPS information and a location category (an amusement park, a tourist destination, an urban area, etc.) has been stored in advance. A method for converting the positional information indicated by the GPS information into a location category, to thus determine a reading sequence, is also conceivable. Specifically, advanced reading is performed in descending sequence of the tourist destination, the amusement park, the urban area, or the like in the location category.

3) Others

For instance, advanced reading is performed in, e.g., a sequence of models, a TIFF-oriented sequence (or conversely, a jpg-oriented sequence), a sequence of date, or the like.

4) Others

A determination method involving a combination of the determination methods described in connection with 1), 2), and 3) may also be adopted.

Operation of the present embodiment is completed through the foregoing operations.

In the present embodiment, the thumbnail images are acquired from the accessory information attached to the original images. However, the thumbnail images may be acquired by another method.

The source from which the thumbnail images and the original images are read may be other than a single piece of equipment or a single recording medium. The thumbnail images may be read from the first equipment (a recording medium), and the original images may be read from the second equipment (a recording medium) However, this may be realized on condition that a correlation between the original images and the thumbnail images is managed.

As has been described, in the present embodiment, thumbnail images are first read, and original images are then read in a predetermined sequence regardless of whether or not any thumbnail image has been selected from the thumbnail images. By means of such a configuration, the time that elapses before completion of downloading of an original image corresponding to the selected thumbnail image can be shortened. Accordingly, the time that elapses before completion of formation of an image from the original image corresponding to the selected thumbnail image can also be shortened.

When the original images are read regardless of whether or not the thumbnail image has been selected, the original images having a high chance of being selected as objects to be printed are read in consideration of the characteristic information about the original images or the like. By means of such a configuration, when any thumbnail image has been selected from the thumbnail images, the original image corresponding to the thus-selected thumbnail image is highly likely to have already been read. Hence, a delay in service, which would otherwise be caused by newly reading original images at that point in time, can be prevented.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus comprising:
an image data acquisition section for acquiring plural pieces of image data;
an accessory information acquisition section for acquiring plural pieces of accessory information corresponding to respective pieces of the acquired image data;
an accessory information processing section for subjecting the respective plural pieces of image data to processing for creating an electronic album, using the accessory information of the respective plural pieces of image data;
an embedded information generation section that generates plural pieces of image identifications uniquely and respectively identifying the plural pieces of image data and that generates plural pieces of accessory information identifications uniquely and respectively identifying the plural pieces of accessory information;
a third storage section that stores (i) a first location information table that stores the plural pieces of generated image identification in association with first location information indicating where the plural pieces of image data are stored in a first storage section and (ii) a second location information table that associates the plural pieces of generated accessory identification in association with second location information indicating where the plural pieces of accessory information are stored in a second storage section, the second location information is different from the first location information;
an information addition section that reads out the plural pieces of image data, and generates and embeds, into each acquired image data read out from the first storage section, digital watermarks indicating the plural pieces of image identification and the plural pieces of accessory identification;
an information addition section for embedding digital watermarks indicating the accessory information corresponding to each acquired image data into each acquired image data, wherein each accessory information includes location information for specifying a storage location of the image data corresponding to each accessory information; and
an image output section for forming images on a recording medium based on the plural pieces of image data embedded with the digital watermarks, and outputting the recording medium as an index sheet;
wherein the accessory information acquisition section acquires attribute information of the respective images included in the index sheet as the accessory information; and
the accessory information processing section performs, as the processing, processing for making a determination as to whether or not the respective images included in the index sheet are to be included in the electronic album, based on the attribute information of the respective images before creating the electronic album.

2. An image forming apparatus comprising:
an image data acquisition section for acquiring plural pieces of image data;
an accessory information acquisition section for acquiring plural pieces of accessory information corresponding to respective pieces of the acquired image data;
an accessory information processing section for subjecting the respective plural pieces of image data to processing for creating an electronic album, using the accessory information of the respective plural pieces of image data;
an embedded information generation section that generates plural pieces of image identifications uniquely and respectively identifying the plural pieces of image data and that generates plural pieces of accessory information identifications uniquely and respectively identifying the plural pieces of accessory information;
a third storage section that stores (i) a first location information table that stores the plural pieces of generated image identification in association with first location information indicating where the plural pieces of image data are stored in a first storage section and (ii) a second location information table that associates the plural pieces of generated accessory identification in association with second location information indicating where the plural pieces of accessory information are stored in a second storage section, the second location information is different from the first location information;
an information addition section that reads out the plural pieces of image data, and generates and embeds, into each acquired image data read out from the first storage section, digital watermarks indicating the plural pieces of image identification and the plural pieces of accessory identification;
an information addition section for adding first location information for specifying the storage location of each accessory information of each acquired image data and second location information for specifying a storage location of the image data corresponding to each accessory information, each acquired image data;
an image output section for forming images on a recording medium based on the plural pieces of image data to which the first and second location information are added, and outputting the recording medium as an index sheet;
wherein the accessory information acquisition section acquires attribute information of the respective images included in the index sheet as the accessory information; and
the accessory information processing section performs, as the processing, processing for making a determination as to whether or not the respective images included in the index sheet are to be included in the electronic album, based on the attribute information of the respective images before creating the electronic album.

3. The image forming apparatus according to claim 2, wherein the first location information for specifying the storage location of each accessory information of each acquired image data includes a uniform resource locator of each accessory information of each acquired image data.

4. The image forming apparatus according to claim 2, wherein the information addition section adds the first and second location information to each acquired image data by embedding digital watermarks of the first and second location information into each acquired image data.

5. An electronic album creation apparatus comprising:
a reading section for reading digital watermarks from respective images included in an index sheet through use of a result of scanning of the index sheet;
an embedded information extract section that extracts the accessory information identification from the read digital water marks;
an accessory information acquiring section for acquiring accessory information of each image included in the index sheet based on the corresponding the accessory information identification;
an accessory information processing section for subjecting the respective images included in the index sheet to processing for creating the electronic album, using the accessory information of the respective images;
an embedded information generation section that generates plural pieces of image identifications uniquely and respectively identifying the plural pieces of image data and that generates plural pieces of accessory information identifications uniquely and respectively identifying the plural pieces of accessory information;
a third storage section that stores (i) a first location information table that stores the plural pieces of generated image identification in association with first location information indicating where the plural pieces of image data are stored in a first storage section and (ii) a second location information table that associates the plural pieces of generated accessory identification in association with second location information indicating where the plural pieces of accessory information are stored in a second storage section, the second location information is different from the first location information;
an information addition section that reads out the plural pieces of image data, and generates and embeds, into each acquired image data read out from the first storage section, digital watermarks indicating the plural pieces of image identification and the plural pieces of accessory identification; the second location information is different from the first location information;
wherein the accessory information acquisition section acquires attribute information of the respective images included in the index sheet as the accessory information; and
the accessory information processing section performs, as the processing, processing for making a determination as to whether or not the respective images included in the index sheet are to be included in the electronic album, based on the attribute information of the respective images before creating the electronic album.

6. The electronic album creation apparatus according to claim 5, wherein
the accessory information acquiring section acquires attribute information of the respective images included in the index sheet as the accessory information; and
the accessory information processing section performs, as the processing, processing for determining a sequence in which the respective images included in the index sheet are to appear in the electronic album, based on the attribute information of the respective images.

7. The electronic album creation apparatus according to claim 5, wherein
the accessory information acquiring section acquires text information corresponding to the respective images included in the index sheet as the accessory information; and
the accessory information processing section performs, as the processing, processing for merging the respective images included in the index sheet with the text information corresponding to the respective images.

8. The electronic album creation apparatus according to claim 5, wherein
the accessory information acquiring section acquires, as the accessory information, layout information corresponding to the respective images included in the index sheet; and
the accessory information processing section performs, as the processing, processing for arranging the respective images included in the index sheet in accordance with the layout information corresponding to the respective images.

9. The electronic album creation apparatus according to claim 5, wherein the accessory information of each image includes location information for specifying a storage location of image data of each image.

10. An image forming method comprising:
acquiring plural pieces of image data;
acquiring plural pieces of accessory information corresponding to respective pieces of the acquired image data;
generating plural pieces of image identifications uniquely and respectively identifying the plural pieces of image data and generating plural pieces of accessory information identifications uniquely and respectively identifying the plural pieces of accessory information with an embedded information generation section;
subjecting the respective plural pieces of image data to processing for creating an electronic album, using the accessory information of the respective plural pieces of image data;
storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section; wherein the second location information is different from the first location information;
generating digital watermarks from the plural pieces of image data read out from the first storage section with an embedded information generation section;
embedding digital watermarks indicating the accessory information corresponding to each acquired image data into each acquired image data, wherein each accessory information includes location information for specifying a storage location of the image data corresponding to each accessory information with the embedded information generation section;
forming an image on a recording medium by an image forming apparatus based on the plural pieces of image data embedded with the digital watermarks, and outputting the recording medium as an index sheet acquiring attribute information of the respective plural pieces of image data included in the index sheet as the accessory information; and processing the plural pieces of accessory information for making a determination as to whether or not the respective plural pieces of image data included in the index sheet are to be included in the electronic album, based on the attribute information of the respective images before creating the electronic album.

11. An electronic album creation method comprising:

reading digital watermarks from respective images included in an index sheet through use of a result of scanning of the index sheet;

acquiring accessory information of each image included in the index sheet based on the corresponding digital watermark; and generating plural pieces of image identifications uniquely and respectively identifying the plural pieces of image data and generating plural pieces of accessory information identifications uniquely and respectively identifying the plural pieces of accessory information with an embedded information generation section;

storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section; wherein the second location information is different from the first location information;

generating digital watermarks from the plural pieces of image data read out from the first storage section with an information addition section;

embedding digital watermarks indicating the accessory information corresponding to each acquired image data into each acquired image data, wherein each accessory information includes location information for specifying a storage location of the image data corresponding to each accessory information with the information addition section;

subjecting by a processing device the respective plural pieces of image data included in the index sheet to processing for creating the electronic album, using the accessory information of the respective images;

acquiring attribute information of the respective plural pieces of image data included in the index sheet as the accessory information; and processing the plural pieces of accessory information for making a determination as to whether or not the respective plural pieces of image data included in the index sheet are to be included in the electronic album, based on the attribute information of the respective images before creating the electronic album.

12. The electronic album creation method according to claim 11, wherein the accessory information of each image includes location information for specifying a storage location of image data of each image.

13. A non-transitory computer-readable medium including a program for causing a computer to implement functions of:

acquiring plural pieces of image data;

acquiring plural pieces of accessory information corresponding to respective pieces of the acquired image data;

generating plural pieces of image identifications uniquely and respectively identifying the plural pieces of image data and generating plural pieces of accessory information identifications uniquely and respectively identifying the plural pieces of accessory information with an embedded information generation section;

subjecting the respective plural pieces of image data to processing for creating an electronic album, using the accessory information of the respective plural pieces of image data;

storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section; wherein the second location information is different from the first location information;

generating digital watermarks from the plural pieces of image data read out from the first storage section with an information addition section;

embedding digital watermarks indicating the accessory information corresponding to each acquired image data into each acquired image data, wherein each accessory information includes location information for specifying a storage location of the image data corresponding to each accessory information with the information addition section;

forming images on a recording medium based on the plural pieces of image data embedded with the digital watermarks, and outputting the recording medium as an index sheet wherein the second location information is different from the first location information acquiring attribute information of the respective plural pieces of image data included in the index sheet as the accessory information; and processing the plural pieces of accessory information for making a determination as to whether or not the respective plural pieces of image data included in the index sheet are to be included in the electronic album, based on the attribute information of the respective images before creating the electronic album.

14. A non-transitory computer-readable medium including a program for causing a computer to implement functions of:

reading digital watermarks from respective images included in an index sheet through use of a result of scanning of the index sheet;

acquiring accessory information of each image included in the index sheet based on the corresponding digital watermark;

generating plural pieces of image identifications uniquely and respectively identifying the plural pieces of image data and generating plural pieces of accessory information identifications uniquely and respectively identifying the plural pieces of accessory information with an embedded information generation section;

subjecting the respective plural pieces of image data to processing for creating an electronic album, using the accessory information of the respective images;

storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section; wherein the second location information is different from the first location information;

generating digital watermarks from the plural pieces of image data read out from the first storage section with an information addition section;

embedding digital watermarks indicating the accessory information corresponding to each acquired image data into each acquired image data, wherein each accessory information includes location information for specifying a storage location of the image data corresponding to each accessory information with the information addition section;

acquiring attribute information of the respective plural pieces of image data included in the index sheet as the accessory information; and processing the plural pieces of accessory information for making a determination as to whether or not the respective plural pieces of image data included in the index sheet are to be included in the electronic album, based on the attribute information of the respective images before creating the electronic album.

15. The computer-readable medium according to claim 14, wherein the accessory information of each image includes location information for specifying a storage location of image data of each image.

16. A non-transitory computer-readable medium including a program for causing a computer to implement functions of:

reading digital watermarks from respective images included in an index sheet through use of a result of scanning of the index sheet;

acquiring accessory information of each image included in the index sheet based on the corresponding digital watermark;

generating plural pieces of image identifications uniquely and respectively identifying the plural pieces of image data and generating plural pieces of accessory information identifications uniquely and respectively identifying the plural pieces of accessory information with an embedded information generation section;

subjecting the respective plural pieces of image data to processing for creating an electronic album, using the accessory information of the respective images;

storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section, wherein the second location information is different from the first location information;

generating digital watermarks from the plural pieces of image data read out from the first storage section with an information addition section;

embedding digital watermarks indicating the accessory information corresponding to each acquired image data into each acquired image data, wherein each accessory information includes location information for specifying a storage location of the image data corresponding to each accessory information with the information addition section; and acquiring text information of the respective plural pieces of image data included in the index sheet as the accessory information; and processing the plural pieces of text information for making a determination as to whether or not the respective plural pieces of image data included in the index sheet are to be included in the electronic album, based on the text information of the respective images before creating the electronic album.

17. A non-transitory computer-readable medium including a program for causing a computer to implement functions of:

reading digital watermarks from respective images included in an index sheet through use of a result of scanning of the index sheet;

acquiring accessory information of each image included in the index sheet based on the corresponding digital watermark;

generating plural pieces of image identifications uniquely and respectively identifying the plural pieces of image data and generating plural pieces of accessory information identifications uniquely and respectively identifying the plural pieces of accessory information with an embedded information generation section;

subjecting the respective plural pieces of image data to processing for creating an electronic album, using the accessory information of the respective images;

storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section; wherein the second location information is different from the first location information;

generating digital watermarks from the plural pieces of image data read out from the first storage section with an information addition section;

embedding digital watermarks indicating the accessory information corresponding to each acquired image data into each acquired image data, wherein each accessory information includes location information for specifying a storage location of the image data corresponding to each accessory information with the information addition section; and acquiring layout information of the respective plural pieces of image data included in the index sheet as the accessory information; and processing the plural pieces of layout information for making a determination as to whether or not the respective plural pieces of image data included in the index sheet are to be included in the electronic album, based on the layout information of the respective images before creating the electronic album.

18. An image forming method comprising:

acquiring plural pieces of image data;

acquiring plural pieces of accessory information corresponding to respective pieces of the acquired image data;

generating plural pieces of image identifications uniquely and respectively identifying the plural pieces of image data and generating plural pieces of accessory information identifications uniquely and respectively identifying the plural pieces of accessory information with an embedded information generation section;

subjecting the respective plural pieces of image data to processing for creating an electronic album, using the accessory information of the respective images;

storing in a third storage section (i) a first location information table that stores the plural pieces of generated image identification in association with first location information indicating where the plural pieces of image data are stored in a first storage section and (ii) storing a second location information table that associates the plural pieces of generated accessory identification in association with second location information indicating where the plural pieces of accessory information are stored in a second storage section; wherein the second location information is different from the first location information;

generating digital watermarks from the plural pieces of image data read out from the first storage section with an information addition section;

embedding digital watermarks indicating the accessory information corresponding to each acquired image data into each acquired image data, wherein each accessory information includes location information for specifying a storage location of the image data corresponding to each accessory information with the information addition section; and adding the first location information for specifying the storage location of each accessory information of each acquired image data and the second location information for specifying a storage location of the image data corresponding to each accessory information, to each acquired image data;

forming images on a recording medium by an image forming apparatus based on the plural pieces of image data to which the first and second location information are added, and outputting the recording medium as an index sheet;

acquiring attribute information of the respective plural pieces of image data included in the index sheet as the accessory information; and processing the plural pieces of accessory information for making a determination as to whether or not the respective plural pieces of image data included in the index sheet are to be included in the electronic album, based on the attribute information of the respective images before creating the electronic album.

* * * * *